(12) United States Patent
Nishino et al.

(10) Patent No.: US 10,500,922 B2
(45) Date of Patent: Dec. 10, 2019

(54) EVAPORATOR

(71) Applicant: DENSO CORPORATION, Kariya, Aichi-pref. (JP)

(72) Inventors: Tatsuhiko Nishino, Kariya (JP); Gouki Akiyoshi, Kariya (JP); Akinori Kuwayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 45 days.

(21) Appl. No.: 15/564,203

(22) PCT Filed: Apr. 15, 2016

(86) PCT No.: PCT/JP2016/002040
§ 371 (c)(1),
(2) Date: Oct. 4, 2017

(87) PCT Pub. No.: WO2016/166987
PCT Pub. Date: Oct. 20, 2016

(65) Prior Publication Data
US 2018/0126822 A1 May 10, 2018

(30) Foreign Application Priority Data
Apr. 17, 2015 (JP) .................. 2015-084847

(51) Int. Cl.
*B60H 1/32* (2006.01)
*F25B 39/02* (2006.01)
(Continued)

(52) U.S. Cl.
CPC ............... *B60H 1/32* (2013.01); *F25B 39/02* (2013.01); *F28F 9/02* (2013.01)

(58) Field of Classification Search
CPC ... B60H 1/32; F28D 1/05383; F28D 1/05391; F28D 2021/0085; F28F 9/002;
(Continued)

(56) References Cited

U.S. PATENT DOCUMENTS 2,893,795 A * 7/1959 Dooling .................. F16J 15/32
277/436
2,910,209 A * 10/1959 Nelson ................... A61G 17/02
220/378
(Continued)

FOREIGN PATENT DOCUMENTS

JP H09158536 A 6/1997
JP 2001233047 A 8/2001
(Continued)

*Primary Examiner* — Ljiljana V. Ciric
(74) *Attorney, Agent, or Firm* — Harness, Dickey & Pierce, P.L.C.

(57) ABSTRACT

An evaporator has an outer peripheral side held by a holding portion. The evaporator includes a body portion and a packing located on a part of the body portion that faces to the holding portion. The packing includes an inner elastic layer and an outer elastic layer. The inner elastic layer has a water absorbability smaller than that of the outer elastic layer and is made of a closed cell foam member. The outer elastic layer is made of an open cell foam member. The holding portion includes a first rib preventing an air from flowing along the outer peripheral side of the body portion, and a second rib preventing a displacement of the body portion. A thickness of the outer elastic layer in a condition where the outer elastic layer is not held by the holding portion is larger than a protrusion length of the first rib.

4 Claims, 6 Drawing Sheets

(51) Int. Cl.
  *F28F 9/02* (2006.01)
  *F28F 9/00* (2006.01)
  *F28D 1/053* (2006.01)
  *F28D 21/00* (2006.01)

(58) Field of Classification Search
  CPC ...... F28F 9/02; F28F 2265/28; F28F 2275/14;
       F28F 2275/143; F28F 2275/02; F28F
       2265/30; F25B 39/02; F25B 2500/12
  USPC .......................................................... 62/515
  See application file for complete search history.

(56) References Cited

U.S. PATENT DOCUMENTS

| | | | | |
|---|---|---|---|---|
| 3,123,170 | A * | 3/1964 | Bryant | B60K 11/04 180/68.4 |
| 4,295,521 | A * | 10/1981 | Sommars | F01P 11/12 165/144 |
| 4,328,859 | A * | 5/1982 | Bouvot | B60H 1/00328 165/149 |
| 4,690,209 | A * | 9/1987 | Martin | F25B 39/02 165/135 |
| 4,715,609 | A * | 12/1987 | Mino | B29C 59/007 277/608 |
| 4,914,929 | A * | 4/1990 | Shimazaki | B60H 1/00521 165/69 |
| 5,096,206 | A * | 3/1992 | Andre | C08G 18/08 277/314 |
| 5,165,251 | A * | 11/1992 | Tsukamoto | B60H 1/3229 285/148.26 |
| 5,632,328 | A * | 5/1997 | Sawyer | B60H 1/00321 165/67 |
| 5,662,162 | A * | 9/1997 | Fukuoka | B60H 1/00328 165/149 |
| 5,980,670 | A * | 11/1999 | Andre | F16L 21/005 138/109 |
| 6,070,659 | A * | 6/2000 | Hosoya | F28D 1/0341 165/178 |
| 6,131,652 | A * | 10/2000 | Ito | B60H 1/00064 165/203 |
| 6,450,253 | B1 * | 9/2002 | Chikuma | F28F 9/002 165/173 |
| 7,377,554 | B2 * | 5/2008 | Motomura | B60H 1/3229 165/41 |
| 7,484,379 | B2 * | 2/2009 | Shibata | B60H 1/00521 62/222 |
| 7,959,161 | B2 * | 6/2011 | Seki | F16J 15/061 277/630 |
| 8,870,189 | B2 * | 10/2014 | Krausz | F16L 17/032 277/609 |
| 9,447,980 | B2 * | 9/2016 | Masui | F25B 39/00 |
| 9,593,892 | B2 * | 3/2017 | Wolf | F28F 9/007 |
| 10,202,017 | B2 * | 2/2019 | Chiba | B60H 1/00521 |
| 2003/0051497 | A1 * | 3/2003 | Nomura | B60H 1/00521 62/239 |
| 2005/0230967 | A1 | 10/2005 | Motomura et al. | |
| 2006/0230774 | A1 * | 10/2006 | Shibata | B60H 1/00521 62/239 |
| 2006/0288725 | A1 * | 12/2006 | Schlosser | F25B 39/02 62/347 |
| 2007/0066208 | A1 | 3/2007 | Almori et al. | |
| 2008/0051497 | A1 * | 2/2008 | Lu | A61K 8/042 524/394 |
| 2008/0142200 | A1 * | 6/2008 | Velzy | F28D 1/05366 165/149 |
| 2014/0096932 | A1 * | 4/2014 | Wolf | F28F 9/007 165/67 |
| 2015/0300756 | A1 | 10/2015 | Takada et al. | |

FOREIGN PATENT DOCUMENTS

| | | | |
|---|---|---|---|
| JP | 2002254919 A | | 9/2002 |
| JP | 2005324777 A | | 11/2005 |
| JP | 2006335189 A | | 12/2006 |
| JP | 2007084061 A | | 4/2007 |
| JP | 2012001124 A | | 1/2012 |
| JP | 2013160475 A | * | 8/2013 |
| JP | 2014108633 A | | 6/2014 |

* cited by examiner

| COMPARATIVE ITEM | SINGLE-LAYER PACKING | | TWO-LAYER PACKING | |
|---|---|---|---|---|
| | LARGE REACTION FORCE MATERIAL | SMALL REACTION FORCE MATERIAL | INSIDE: BUTYL RUBBER / OUTSIDE: LARGE REACTION FORCE MATERIAL | INSIDE: LARGE REACTION FORCE MATERIAL / OUTSIDE: SMALL REACTION FORCE MATERIAL |
| NOISE | × | ◎ | ○ | ○ |
| CORROSION RESISTANCE | ○ | × | ○ | ○ |
| POSITIONING | ◎ | × | ○ | ○ |
| WEIGHT | ○ | ○ | × | ○ |
| COST | ◎ | ○ | × | ○ |
| PRODUCTIVITY | ◎ | ○ | △ | ○ |
| | EX1 | EX2 | EX3 | EX4 |

◎: EXCELLENT
○: GOOD
△: MEDIOCRE
×: POOR

EVAPORATOR

CROSS REFERENCE TO RELATED APPLICATIONS

This application is a U.S. National Phase Application under 35 U.S.C. 371 of International Application No. PCT/JP2016/002040 filed on Apr. 15, 2016 and published in Japanese as WO 2016/166987 A1 on Oct. 20, 2016. This application is based on and claims the benefit of priority from Japanese Patent Application No. 2015-084847 filed on Apr. 17, 2015. The entire disclosures of all of the above applications are incorporated herein by reference.

TECHNICAL FIELD

The present disclosure relates to an evaporator used as a part of an air conditioning system such as an automobile air conditioner.

BACKGROUND ART

An air conditioning system installed in a vehicle is required to be small as a whole due to a limitation of a space. Additionally, the air conditioning system is required to be light for improving a fuel economy of a vehicle. To meet these requirements, in recent years, the evaporator is made light in weight by using a thin material, for example.

However, when the evaporator is lighten in weight, stiffness of each part of the evaporator may decrease, and accordingly a vibration may be likely to occur. Therefore, during an operation of an air conditioning system, a vibration may be generated in the evaporator and be transferred to a vehicle compartment, and a large noise may be generated. A vibration generated by a refrigerant passing through an inside of the evaporator and a vibration (noise) generated by a pulsing motion occurring when a compressor discharges or draws the refrigerant are examples of the vibration generated in the evaporator. The noise generated by the transfer of the vibration is not preferable because the noise makes a driver feel uncomfortable.

In Patent Document 1 discloses an evaporator in which a vibration suppression and heat insulation member is attached on an outer peripheral surface of the evaporator. The vibration suppression and heat insulation member has a two-layer structure. An inner (evaporator side) layer is a vibration suppression layer made of an unvulcanized butyl rubber, and an outer layer is a heat insulation sheet made of a heat insulation material. The unvulcanized butyl rubber (vibration suppression layer) that has a relatively large relative density is adhered to the evaporator.

PRIOR ART DOCUMENT

Patent Document

Patent Document 1: JP 2013-160475 A

SUMMARY OF THE INVENTION

When a generation of noise is limited by attaching a component having a large relative density to the evaporator, the evaporator may become heavier. Moreover, since the unvulcanized butyl rubber that is used as the vibration suppression layer is a relatively expensive material, the evaporator may become costly.

It is an objective of the present disclosure to provide an evaporator capable of limiting a generation of a noise transferred to a driver's seat of a vehicle without increasing the weight and the cost of the evaporator.

An evaporator according to an aspect of the present disclosure has an outer peripheral side held by a holding portion. The evaporator includes a body portion that is a heat exchanger in which a refrigerant flows, and a packing provided on a part of the body portion that faces to the holding portion. The packing includes an inner elastic layer closest to the body portion in the packing, and an outer elastic layer closest to the holding portion in the packing. A reaction force of the outer elastic layer generated when the outer elastic layer is compressed by a certain volume is smaller than a reaction force of the inner elastic layer generated when the inner elastic layer is compressed by the certain volume In the evaporator having such configuration, the packing including at least two layers is provided between the body portion of the evaporator and the holding portion of an air conditioning system. The inner elastic layer closest to the body portion and the outer elastic layer closest to the holding portion are different from each other in a size of the reaction force against a compression.

When deformation amounts by compression are the same, a reaction force of the outer elastic layer against the compression is smaller than a reaction force of the inside elastic layer against the compression. That is, the outer elastic layer is made of a material that is softer than the inner elastic layer.

For example, when the evaporator (packing) is held by multiple positioning ribs provided in the holding portion, the positioning ribs presses the inner elastic layer whose reaction force against compression is large, and accordingly the evaporator can be held without displacement. In a part between the body portion and a part of the holding portion in which the positioning ribs are not provided, the outer elastic layer is slightly deformed.

In such case, since only a minimum part (e.g. a part corresponding to a node of a vibration) is pressed by the positioning rib, the vibration (noise) can be limited from being transferred to a vehicle compartment through the holding portion of the air conditioning system with appropriate positioning of the evaporator.

In the part other than the positioning ribs, since the evaporator is pressed by a relatively small force, the vibration of the evaporator is scarcely transferred through the holding portion. Since a gap between the body portion and the holding portion is filled by the packing, an air is limited from passing through the gap.

As described above, according to the evaporator of the present disclosure, the transfer of the vibration through the holding portion of the air conditioning system can be limited while the vibration of the evaporator is not limited. Accordingly, a generation of a noise that reaches a driver's seat of a vehicle is limited. The packing can be made without using a material whose weight and cost are large such as unvulcanized butyl rubber.

According to the present disclosure, a weight and a cost of the evaporator can be reduced, and the generation of the noise that reaches the vehicle compartment can be limited.

EMBODIMENTS FOR EXPLOITATION OF THE INVENTION

Hereinafter, an embodiment for implementing the present disclosure will be described referring to drawings. In the respective drawings, a part that corresponds to a matter illustrated in a preceding drawing may be assigned the same reference numeral, and redundant explanation for the part may be omitted.

Figure 1:
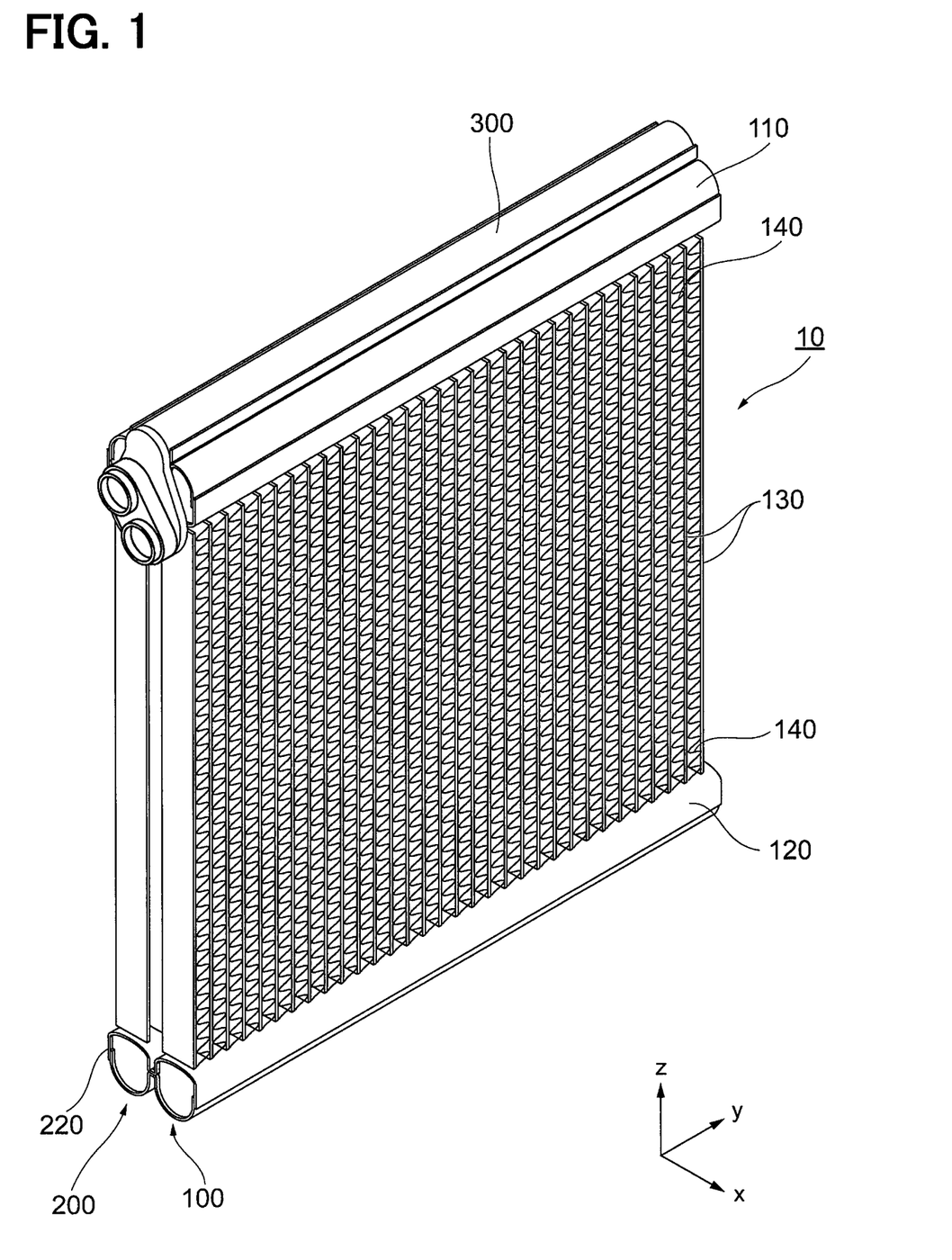
FIG. 1 is a perspective view illustrating an evaporator according to an embodiment of the present disclosure.

An evaporator 10 shown in FIG. 1 constitutes a part of a refrigeration cycle that is an air conditioning system for a vehicle. A refrigerant is sent to the evaporator 10 from a radiator located upstream of the evaporator in the refrigeration cycle. The refrigerant sent into the evaporator 10 is evaporated, and the evaporator 10 performs a heat exchange between the refrigerant and an air to cool the air.

Figure 2:
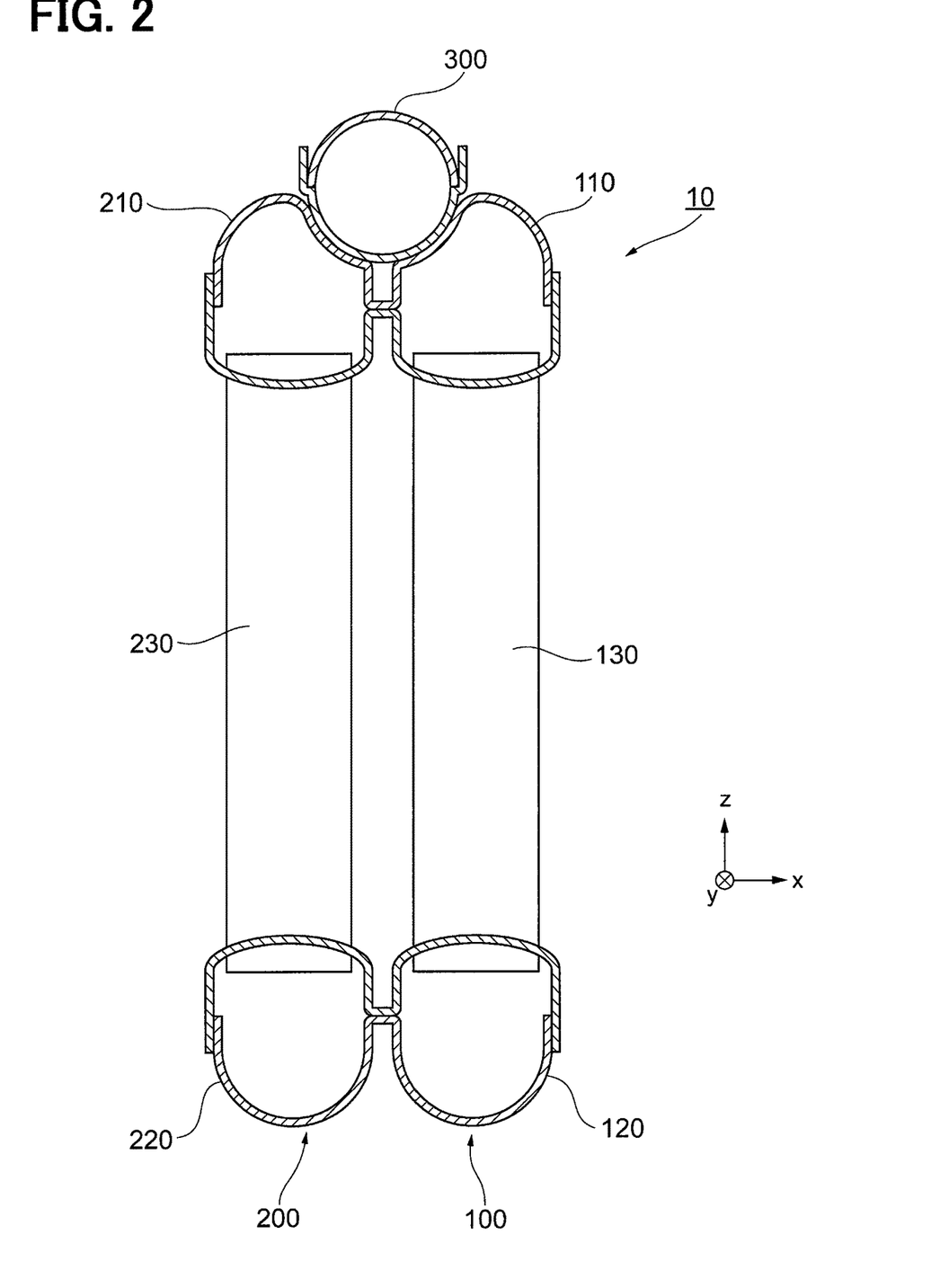
FIG. 2 is a cross-sectional view schematically illustrating a configuration of the evaporator of FIG. 1.

Configurations of the evaporator 10 will be described referring to FIGS. 1 and 2. FIG. 1 is a perspective view illustrating a whole structure of the evaporator 10. FIG. 2 is a cross-sectional view schematically illustrating the evaporator 10 taken at a center (a center in y-direction, described later). FIG. 2 may be a cross-section of the evaporator 10 taken along a direction perpendicular to the y-direction. In FIGS. 1 and 2, a packing 400 is omitted. As shown in FIGS. 1 and 2, the evaporator 10 includes a first heat exchange portion 100, a second heat exchange portion 200, and an ejector housing portion 300.

The first heat exchange portion 100 includes a first upper tank 110, a first lower tank 120, tubes 130, and corrugated fins 140.

The first upper tank 110 is a container that temporarily stores the refrigerant supplied to the first heat exchange portion 100, and the refrigerant is supplied to the tubes 130 from the first upper tank 110. The first upper tank 110 is a container having a thin and long rod shape. The first upper tank 110 is located on an upper side of the first heat exchange portion 100, and a longitudinal direction of the first upper tank 110 extends along a horizontal direction.

The first lower tank 120 is a container having almost the same shape as the first upper tank 110. The first lower tank 120 receives the refrigerant flowing from the first upper tank 110 through the tubes 130. The first lower tank 120 is located on a lower side of the first heat exchange portion 100, and a longitudinal direction of the first lower tank 120 extends along the horizontal direction similarly to the first upper tank 110.

The tube 130 is a thin and long pipe whose cross-sectional shape is a platy shape, and multiple tubes 130 are provided in the first heat exchange portion 100. A flow passage is formed in the tube 130 along a longitudinal direction of the tube 130. The longitudinal direction of tubes 130 is along a vertical direction, and the tubes 130 are stacked with each other such that one surface of respective tubes 130 faces to each other. A stacking direction of multiple tubes 130 is the same as the longitudinal direction of the first upper tank 110.

One end of each tube 130 is connected to the first upper tank 110, and the other end is connected to the first lower tank 120. According to this configuration, an inside space of the first upper tank 110 and an inside space of the first lower tank 120 are communicated with each other through the flow passage in each tube 130.

The refrigerant moves from the first upper tank 110 to the first lower tank 120 through an inside of the tube 130. At this time, a heat exchange between the refrigerant and the air passing through the first heat exchange portion 100 is performed, and accordingly the refrigerant is converted from a liquid-phase into a gas-phase. A temperature of the air is absorbed by the heat exchange with the refrigerant and is decreased.

The corrugated fin 140 is formed from a metal plate by bending into a wavy shape and is disposed between the tubes 130. Each crest portion of the corrugated fins 140 is in contact with and brazed to an outer surface of the tube 130. The heat of the air passing through the first heat exchange portion 100 is transferred to the refrigerant through the corrugated fins 140 as well as the tube 130. A contact area of the first heat exchange portion 100 with the air is increased by the corrugated fins 140, and the heat exchange between the refrigerant and the air is performed effectively.

The corrugated fins 140 are disposed in a whole part between the tubes 130, i.e. from the first upper tank 110 to the first lower tank 120. In FIG. 1, only a part of the corrugated fins 140 is illustrated, and the other part is omitted.

The inside space of the first upper tank 110 and the inside space of the first lower tank 120 may be partitioned into multiple sections by partition boards, and the refrigerant may flow so as to move back and forth (in both directions) between the first upper tank 110 and the first lower tank 120. In the present disclosure, a pathway of the refrigerant is not limited.

In FIGS. 1 and 2, an x-direction is a direction in which the air passes through the evaporator 10 from the second heat exchange portion 200 toward the first heat exchange portion 100. An x-axis is an axis parallel to the x-direction. The y-direction is the longitudinal direction of the first upper tank 110. A y-axis is an axis parallel to the y-direction. The y-direction may be a direction from a front side toward a back side in FIG. 2. A z-direction is a direction from the first lower tank 120 toward the first upper tank 110. A z-axis is an axis parallel to the z-direction. The x-axis, the y-axis, and the z-axis are set in the same way in the drawings other than FIG. 2.

The second heat exchange portion 200 includes a second upper tank 210, a second lower tank 220, tubes 230, and corrugated fins 240. Configurations of the second heat exchange portion 200 are almost the same as the configurations of the first heat exchange portion 100 described above. The second upper tank 210 corresponds to the first upper tank 110, and the second lower tank 220 corresponds to the first lower tank 120. The tubes 230 correspond to the tubes 130, and the corrugated fins 240 correspond to the corrugated fins 140.

As described above, in the evaporator 10, the first heat exchange portion 100 and the second heat exchange portion 200 which have almost the same configurations are stacked with each other along the direction (x-direction) in which the air flows. The air is cooled by passing through the second heat exchange portion 200 and the first heat exchange portion 100 in this order, and subsequently the air is supplied to the vehicle compartment.

The ejector housing portion 300 is a container for accommodating an ejector that is a part of the refrigeration cycle. The ejector housing portion 300 is a container having a thin and long rod shape similarly to the first upper tank 110. A longitudinal direction of the ejector housing portion 300 is along the y-direction. The ejector housing portion 300 is located upward of and between the first upper tank 110 and the second upper tank 210.

The ejector accommodated in the ejector housing portion 300 is located in a refrigerant passage between the radiator and the second heat exchange portion 200. The refrigerant discharged from the radiator is decompressed by passing through the ejector, and subsequently the refrigerant is supplied to the second heat exchange portion 200. That is, the ejector works as a decompression mechanism located upstream of the second heat exchange portion 200.

The refrigerant passage is branched at a position located upstream of the ejector, and a downstream end portion of the branch passage is connected to the first heat exchange portion 100. A part of the refrigerant is supplied to the second heat exchange portion 200 through the ejector, and the other part of the refrigerant is supplied to the first heat exchange portion 100.

A downstream end portion of a passage for discharging the refrigerant from the first heat exchange portion 100 is connected to a suction port of the ejector. The ejector enhances a discharge of the refrigerant from the first heat exchange portion 100 by using a flow of the refrigerant jetted toward the second heat exchange portion 200. These functions of the ejector reduce a load of the compressor in the refrigeration cycle.

An attachment structure of the evaporator 10 to the air conditioning system for a vehicle will be described below. An opening portion having a rectangular shape is formed in a part of the air conditioning system (HVAC) to which the evaporator 10 is attached. The evaporator 10 is attached to the air conditioning system such that a part of the evaporator 10 (core portion) in which the tubes 130, 230, and the corrugated fins 140, 240 are provided overlaps the opening portion. In the descriptions below, a rim part of the opening portion formed in the air conditioning system, i.e. a part that holds the evaporator 10 from an outer peripheral side, is described as "a holding portion 500".

Figure 3:
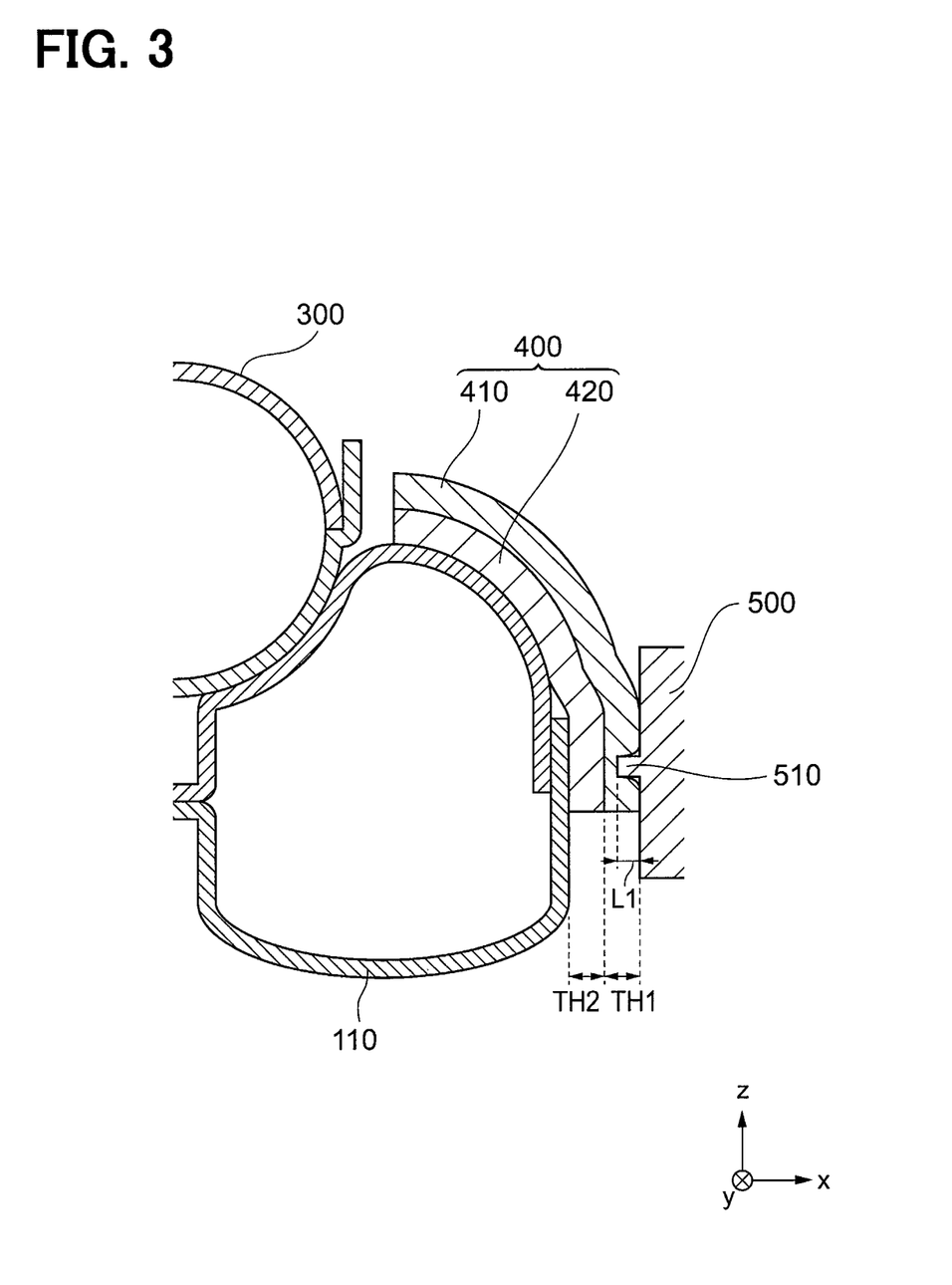
FIG. 3 is a diagram illustrating the evaporator of FIG. 1.
Figure 4:
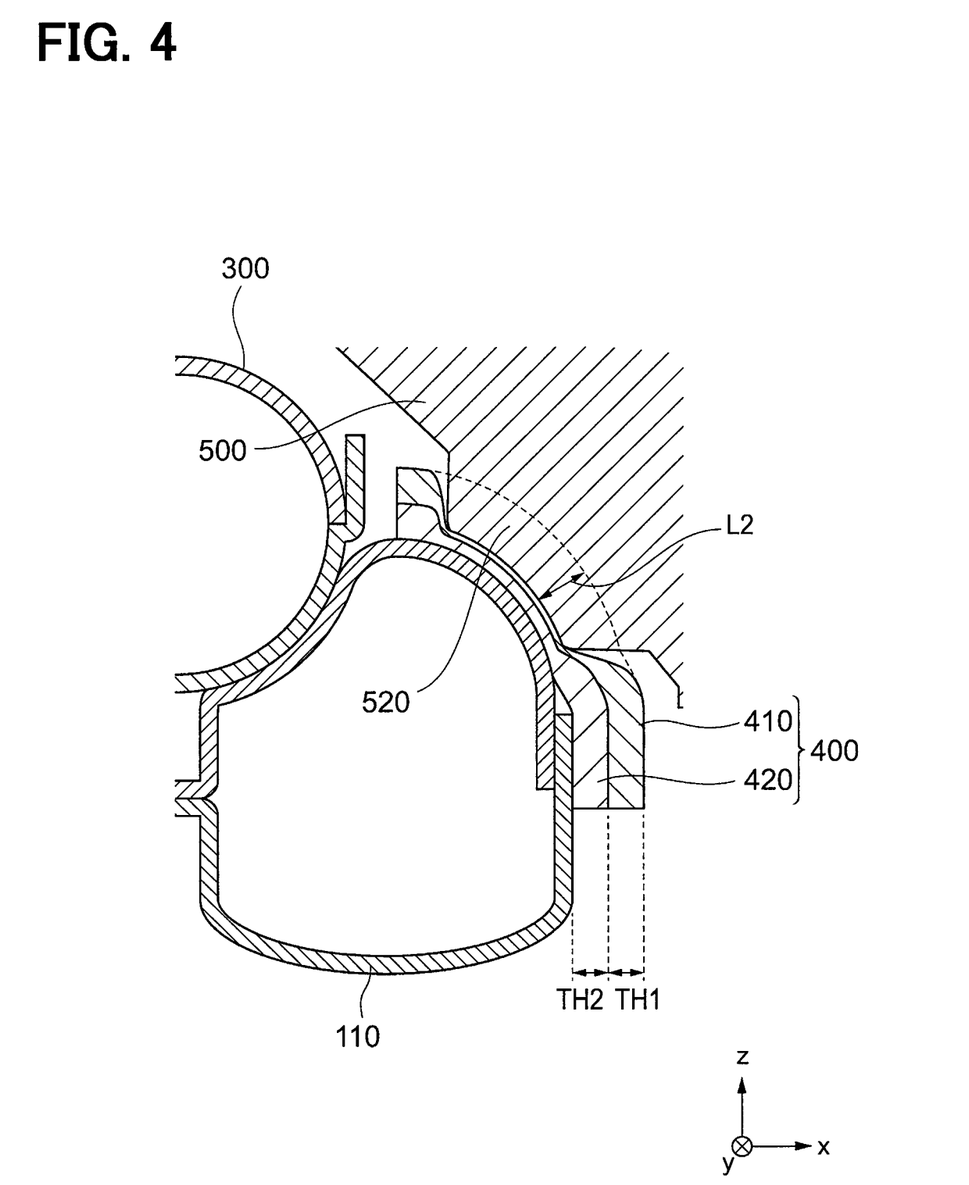
FIG. 4 is a diagram illustrating the evaporator of FIG. 1.

FIGS. 3 and 4 are cross-sectional diagrams illustrating a part of the evaporator 10 attached to the air conditioning system, the part including the first upper tank 110 and its vicinity. Both FIGS. 3 and 4 illustrate a cross-section perpendicular to the y-axis. The cross-sections of FIGS. 3 and 4 are different in position in the y-direction.

The packing 400 is provided on a part of an outer surface of the first upper tank 110 which extend from an upper end portion of the outer surface to a lateral surface facing to the x-direction. The packing 400 constitutes a part of the evaporator 10, and the packing 400 is provided to cover a part of the first upper tank 110 and almost entire part of the evaporator 10 opposed to the holding portion 500. The packing 400 is bonded to the evaporator 10 by a double-sided tape or an adhesive agent. In the following descriptions, a part of the evaporator 10 excepting the packing 400 may be described as "body portion". The body portion may be a whole part of the first upper tank 110, for example.

Since the packing 400 is provided so as to fill a gap between the body portion and the holding portion 500, the air is prevented from passing through the gap. The holding portion 500 holds and positions the evaporator 10 through the packing 400 in the whole part.

The packing 400 has a two-layer structure constituted by an outer elastic layer 410 and an inner elastic layer 420. The outer elastic layer 410 is made of ether-based polyurethane foam, and the inner elastic layer 420 is made of polyethylene foam. The outer elastic layer 410 may be closest to the holding portion 500 in the packing 400. The inner elastic layer 420 may be closest to the body portion in the packing 400.

A density of the outer elastic layer 410 is 0.04 g/cm$^3$, and a density of the inner elastic layer 420 is 0.03 g/cm$^3$. Thicknesses of the outer elastic layer 410 and the inner elastic layer 420 are both 3 mm. The thickness of the outer elastic layer 410 and the thickness of the inner elastic layer 420 may be different from each other.

A compression load of the outer elastic layer 410 is 0.49 N/cm$^2$, and the outer elastic layer 410 is a relatively soft layer. In contrast, a compression load which is a pressure required for compressing the inner elastic layer 420 by 25% is 3.9 N/cm$^2$, and the inner elastic layer 420 is a relatively hard layer. In the present embodiment, materials of the outer elastic layer 410 and the inner elastic layer 420 are selected such that a reaction force generated when the outer elastic layer 410 is compressed by a certain amount (25%, for example) is smaller than a reaction force generated when the inner elastic layer 420 is compressed by the certain amount.

The above-described materials are just examples, and the outer elastic layer 410 may be made of a material other than ether-based polyurethane foam, and the inner elastic layer 420 may be made of a material other than polyethylene foam. However, it is necessary to select each material such that the compression load of the outer elastic layer 410 is smaller than the compression load of the inner elastic layer 420. A water absorbability of the inner elastic layer 420 is preferred to be small as described below, the material of the inner elastic layer 420 may be selected in consideration of this.

The outer elastic layer 410 is an open cell foam member. That is, multiple bubbles in the outer elastic layer 410 are interconnected. Therefore, water absorbability of the outer elastic layer 410 is relatively large.

The inner elastic layer 420 is a closed cell foam member. That is, multiple bubbles in the inner elastic layer 420 are sealed from each other and are not interconnected. Therefore, water absorbability of the inner elastic layer 420 is relatively small.

The temperature of the body portion of the evaporator 10 is low while the refrigerant circulates in the refrigeration cycle, and a condensation may occur on a surface of the first upper tank 110, for example. However, the inner elastic layer 420 that is directly in contact with the body portion of the evaporator 10 is the closed cell foam member, and its water absorbability is small. Accordingly, the water generated by the condensation scarcely infiltrates the inner elastic layer 420, and a corrosion in the inner elastic layer 420 caused by an infiltration of water is limited.

As shown in FIG. 3, a first rib 510 protruding toward the evaporator 10 is provided on a part of a surface of the holding portion 500 facing to the evaporator 10. The first rib 510 extends along a longitudinal direction of the packing 400. A part of the first rib 510 illustrated in FIG. 3 extends along the y-axis.

The first rib 510 presses the packing 400 so as to the air is limited from passing through the gap between the evaporator 10 and the holding portion 500. The first rib 510 may press the packing 400 so as to the air is limited from passing along an outer peripheral side of the body portion.

A thickness TH1 of the outer elastic layer 410 in a condition where the evaporator 10 is not held by the holding portion 500 and the packing 400 is not compressed is thicker (larger in size) than a protrusion length L1 of the first rib 510. The protrusion length L1 of the first rib 510 is a distance from a surface of the packing 400 that is not compressed to a tip of the first rib 510. The protrusion length L1 of the first rib 510 is equal to the amount of compression of the packing 400 by the first rib 510 in a condition where the evaporator 10 is held by the holding portion 500. In FIG. 3, the protrusion length L1 of the first rib 510 is a distance from a base of the first rib 510 to the tip of the first rib 510.

When the evaporator 10 is held by the holding portion 500, as shown in FIG. 3, only the outer elastic layer 410 of the packing 400 is compressed by the first rib 510, and the inner elastic layer 420 is scarcely compressed by the first rib 510.

Accordingly, a reaction force against the compression by the first rib 510 is relatively small. Consequently, when a vibration accompanying a flow of the refrigerant occurs in the evaporator 10, the vibration is absorbed by the packing 400, and the vibration is unlikely to be transferred to the holding portion 500.

As shown in FIG. 4, a second rib 520 protruding toward the evaporator 10 is provided on a part of the surface of the holding portion 500 facing to the evaporator 10 which is different from the part where the first rib 510 is provided.

The second rib 520 fixes the evaporator 10 by pressing the packing 400 and limits a displacement of the evaporator 10. A protrusion length L2 of the second rib 520 is larger than the protrusion length L1 of the first rib 510 so as to solidly hold the evaporator 10 by strongly pressing the packing 400. The protrusion length L2 of the second rib 520 may be equal to the protrusion length L1 of the first rib 510.

The protrusion length L2 is defined in the same way as the protrusion length L1 of the first rib 510. That is, the protrusion length L2 of the second rib 520 is a distance from a surface of the packing 400 that is not compressed to a tip of the second rib 520. The protrusion length L2 of the second rib 520 is equal to the amount of compression of the packing 400 by the second rib 520 while the evaporator 10 is held by the holding portion 500. In FIG. 4, the position of the surface of the packing 400 while the packing 400 is not compressed is indicated by a dashed line.

The thickness TH1 of the outer elastic layer 410 while the packing 400 is not compressed is thinner (smaller in size) than the protrusion length L2 of the second rib 520. When the evaporator 10 is held by the holding portion 500, both the outer elastic layer 410 and the inner elastic layer 420 are largely compressed by the second rib 520, as shown in FIG. 4. A thickness of the inner elastic layer 420 while the packing 400 is not compressed is a thickness TH2, and the thickness of the inner elastic layer 420 in FIG. 4 is thinner than the thickness TH2.

Accordingly, the reaction force against compression by the second rib 520 is relatively large due to the compression of the outer elastic layer 410. Consequently, the packing 400 is solidly supported, and the evaporator 10 in HVAC is unlikely to be displaced.

Figure 5:
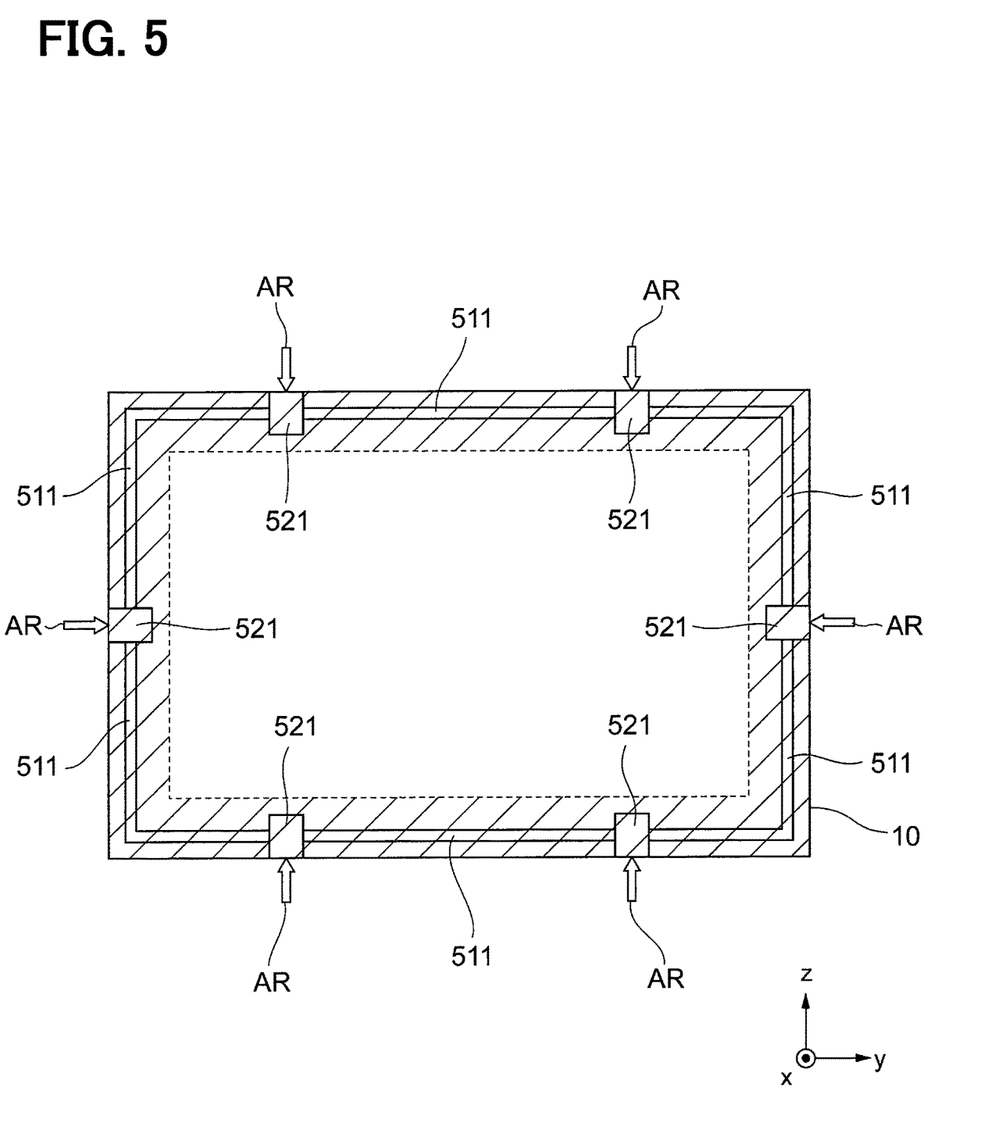
FIG. 5 is a diagram for explaining positions where a packing is pressed, according to the embodiment.

The positions of the first rib 510 and the second rib 520 provided in the holding portion 500 will be described referring to FIG. 5. FIG. 5 is a diagram schematically illustrating the positions where the packing 400 is pressed by the first rib 510, for example. In FIG. 5, an outline of the evaporator 10 viewed along the x-axis is schematically illustrated.

The packing 400 is located in an area indicated by hatching around an outer peripheral portion of the evaporator 10. Parts of the packing 400 compressed by the first ribs 510 are indicated by numerals 511. Hereinafter, these parts are described as "compressed parts 511". Parts of the packing 400 compressed by the second ribs 520 are indicated by numerals 521. Hereinafter, these parts are described as "compressed parts 521".

The positions of the hatched parts indicating the packing 400, the compressed parts 511 in which the packing 400 is compressed by the first rib 510, and the compressed parts 521 in which the packing 400 is compressed by the second rib 520, are schematically illustrated in FIG. 5 for facilitating understandings. Therefore, the positions and dimensions of those are different from the actual positions and dimensions. The positions in which the first rib 510 is provided may correspond to the compressed parts 511. The positions in which the second 520 is provided may correspond to the compressed parts 521.

As shown in FIG. 5, the first ribs 510 are located so as to surround almost the whole part of the core portion along the packing 400. The first rib 510 is not provided at parts where the second rib 520 is provided.

Six second ribs 520 are provided in total and spaced from each other. The second ribs 520 are positioned along a direction in which the first rib 510 extends.

Parts indicated by arrows AR in FIG. 5 correspond to nodes of the vibration (resonance) of the evaporator 10 accompanying the flow of the refrigerant. All of the second ribs 520 are provided in the parts indicated by the arrows AR.

As described above, a large reaction force against compression of the inner elastic layer 420 occurs at parts where the second ribs 520 are provided. Since the parts compressed by the second ribs 520 correspond to the nodes of the vibration, an amplitude of the evaporator 10 is the smallest at those parts. Accordingly, when a vibration of the evaporator 10 (body portion) occurs, a large vibration is not transferred to HVAC through the second rib 520, and accordingly a noise due to the vibration scarcely reaches the vehicle compartment.

A position different from the second rib 520, especially a part corresponding to an antinode of the vibration between the arrows AR, is vibrated with a relatively large amplitude. However, in such position, since only the outer elastic layer 410 is compressed, only a relatively small reaction force against the compression occurs. Accordingly, the vibration is scarcely transferred to the holding portion 500 even when a vibration of the evaporator 10 (body portion) occurs.

In the present embodiment, since the first rib 510 and the second rib 520 are located as described above, the evaporator 10 is solidly supported, and a generation (transfer) of the noise transferred to a driver's seat can be limited.

Figure 6:
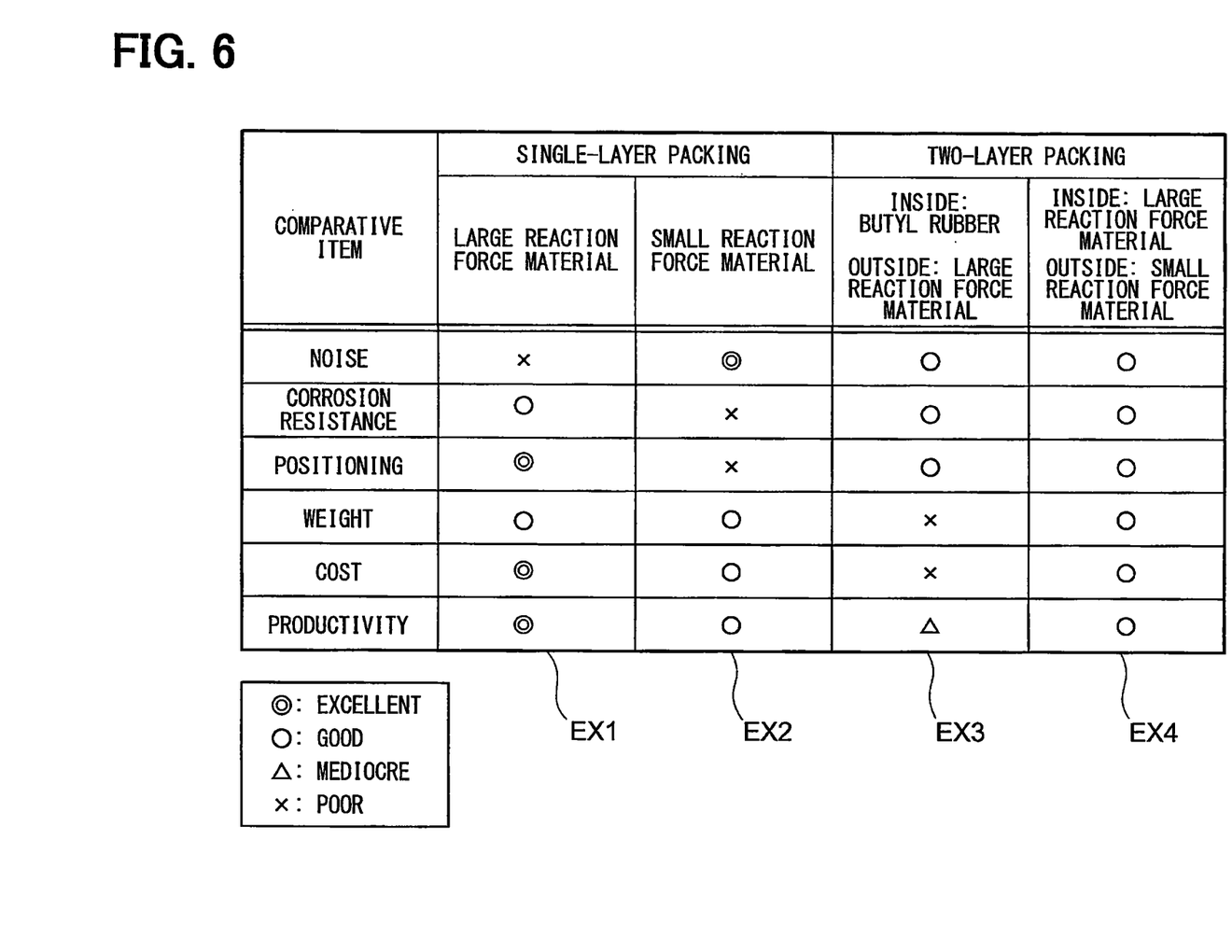
FIG. 6 is a diagram showing properties of the evaporator of FIG. 1 by comparing with comparative examples.

A result of comparison between packing according to comparative examples of the present disclosure and the packing 400 according to the present embodiment will be described below. A packing according to a comparative example EX1 shown in a table of FIG. 6 is made of polyethylene foam in which the whole part is a single layer. That is, the whole part of the packing according to the comparative example EX1 is made of the same material as the inner elastic layer 420, and the reaction force against compression is relatively large.

A packing according to a comparative example EX2 is constituted by a single layer of ether-based polyurethane foam. Whole part of the packing according to the comparative example EX2 is made of the same material as the outer elastic layer 410, and the reaction force against compression is relatively small.

A packing according to a comparative example EX3 has a two-layer structure similarly to the present embodiment. An inner (body portion side) layer of the packing according to the comparative example EX3 is a vibration suppression layer made of unvulcanized butyl rubber. An outer (holding portion 500 side) layer of the packing according to the comparative example EX3 is a layer made of polyethylene foam same as the inner elastic layer 420. The example EX4 is the packing 400 according to the present embodiment described above.

When the packing according to the comparative example EX1 is used, the evaporator 10 is solidly held due to a large reaction force occurring whole part of the packing. Therefore, the comparative example EX1 is preferable in positioning. Moreover, since the whole part is made of polyethylene foam that is cheap, cost for the evaporator 10 can be reduced. Further, since the packing according to the comparative example EX1 has an appropriate hardness, the comparative example EX1 is preferable in a mountability of the packing to the body portion and productivity.

However, since a large reaction force against the compression occurs in the whole part of the packing, the vibration occurring in the body portion of the evaporator 10 may be likely to be transferred to the holding portion 500. Therefore, when the packing according to the comparative example EX1 is used, a large sound (noise) accompanying the vibration of the evaporator 10 may be transferred to the vehicle compartment through the holding portion 500.

When the packing according to the comparative example EX2 is used, only a small reaction force against the compression occurs in whole part of the packing. The evaporator 10 is held by a small force, and the vibration occurring in the body portion of the evaporator 10 is unlikely to be transferred to the holding portion 500. Accordingly, the sound (noise) is limited from being transferred to the vehicle compartment through the holding portion 500.

However, since the whole part of the evaporator 10 is held by small force, the evaporator 10 may be displaced. The whole part of the packing, including a part in contact with the body portion of the evaporator 10, is made of open cell foam member having a water absorbability. Therefore, the water generated by condensation is likely to infiltrate the packing, and the condensed water may adhere to the evaporator 10 for a long time, and accordingly a corrosion may occur on the evaporator 10. That is, the evaporator 10 provided with the packing according to the comparative example EX2 may have a relatively small corrosion resistance.

When the packing according to the comparative example EX3 is used, unvulcanized butyl rubber (vibration suppression layer) having a relatively large relative density is attached to the evaporator 10, and accordingly a generation of the vibration in the evaporator 10 is limited. However, the evaporator 10 may be heavy because of the packing. Moreover, since unvulcanized butyl rubber is relatively expensive, the cost of the evaporator 10 may be higher.

The unvulcanized butyl rubber is an adhesive material. The packing can be adhered to the body portion of the evaporator 10 by using the adhesiveness without a double-sided tape or the like. However, since the attachment of the packing is performed by a machine in mass production, the unvulcanized butyl rubber may adhere to the machine, and accordingly the attachment may become difficult. Accordingly, the packing according to the comparative example EX3 may not be preferable in productivity.

In contrast to the above-described packings according to the comparative examples EX1, EX2, or EX3, the packing 400 according to the example EX4 is capable of limiting the noise from being transferred to the vehicle compartment, as described above. Moreover, the packing 400 is preferable in corrosion resistance and positioning.

The HVAC to which the evaporator 10 is attached is likely to be made of resin and has a mode of a characteristic vibration within a low frequency range (below 1 kHz). Since an energy of the low-frequency vibration is relatively large, the effect in limiting the vibration by the unvulcanized butyl rubber according to the comparative example EX3 may not be adequate. Therefore, the packing 400 according to the example EX4 is preferable in limiting the generation of the noise transferred to the vehicle compartment.

Since the packing 400 does not include a material having a large relative density such as unvulcanized butyl rubber, the weight of the evaporator 10 does not become too heavy. Moreover, since both polyethylene foam (inner elastic layer 420) and ether-based polyurethane foam (outer elastic layer 410) are relatively cheap, the cost of the evaporator 10 can be limited. Further, since they are not adhesive, the packing can be attached by a machine easily.

In the description above, an example where the packing 400 has a two-layer structure is explained, but the embodiment of the present disclosure is not limited to the two-layer structure. For example, one or more layers made of another material may be interposed between the outer elastic layer 410 and the inner elastic layer 420.

In the present embodiment, the packing 400 is provided in the whole part of a rim of the opening portion having a rectangular shape that is formed in the air conditioning system (HVAC) (refer to hatching area of FIG. 5). Instead of this configuration, the packing 400 may be provided only in a part between the holding portion 500 and the first upper tank 110, for example. That is, the packing 400 may be provided in a part of the rim of the opening portion, not in the whole part of the rim of the opening portion.

An embodiment of the present disclosure has been described with reference to specific examples. However, the present disclosure is not limited to the specific examples. Modifications by a skilled person are included in the scope of the present disclosure as long as including the features of the present disclosure. For example, positions, materials, conditions, shapes, or sizes of parts of the embodiment are not limited to the examples and can be modified. Although the present disclosure has been fully described in connection with the preferred embodiment thereof, it is to be noted that various changes and modifications will become apparent to those skilled in the art. Moreover, other combinations and configurations, including more, less or only a single element, are also within the spirit and scope of the present disclosure.

The invention claimed is:

1. A holding structure of an evaporator with a body portion, the holding structure comprising:
   a packing adhered to a surface of the evaporator; and
   an air-conditioning case that defines an air passage in which the evaporator is provided, the air-conditioning case including a holding portion that protrudes from an inner surface of the air-conditioning case to hold the evaporator by compressing the packing, wherein
   the packing includes
      an inner elastic layer closest to the body portion in the packing, and
      an outer elastic layer closest to the holding portion in the packing,
   a bulk modulus of the outer elastic layer is smaller than a bulk modulus of the inner elastic layer,
   a water absorbability of the inner elastic layer is smaller than a water absorbability of the outer elastic layer, the inner elastic layer is made of a closed cell foam member, the outer elastic layer is made of an open cell foam member, the holding portion includes
- a first rib that compresses the packing to prevent an air from flowing along the outer peripheral side of the body portion, and
- a second rib that compresses the packing to prevent a displacement of the body portion, and a thickness of a part of the outer elastic layer that is not compressed by the holding portion is larger than a protrusion length of the first rib.

2. The holding structure of the evaporator according to claim 1, wherein
the thickness of the part of the outer elastic layer that is not compressed by the holding portion is smaller than a protrusion length of the second rib.

3. The holding structure of the evaporator according to claim 1, wherein
the protrusion length of the first rib is smaller than a protrusion length of the second rib.

4. The holding structure of the evaporator according to claim 2, wherein
the protrusion length of the first rib is smaller than the protrusion length of the second rib.

* * * * *